US012115818B2

(12) United States Patent
Dorfi et al.

(10) Patent No.: US 12,115,818 B2
(45) Date of Patent: Oct. 15, 2024

(54) TIRE WITH BI-DIRECTIONAL PERFORMANCE

(71) Applicant: Bridgestone Americas Tire Operations, LLC, Nashville, TN (US)

(72) Inventors: Hans Robert Dorfi, Akron, OH (US); Sharon Elaine Reinhardt, Fairlawn, OH (US); Robert Wayne Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1173 days.

(21) Appl. No.: 16/448,134

(22) Filed: Jun. 21, 2019

(65) Prior Publication Data

US 2019/0299720 A1    Oct. 3, 2019

Related U.S. Application Data

(62) Division of application No. 14/653,009, filed as application No. PCT/US2013/074038 on Dec. 10, 2013, now abandoned.

(Continued)

(51) Int. Cl.
*B60C 11/12*   (2006.01)
*B60C 5/00*    (2006.01)
(Continued)

(52) U.S. Cl.
CPC ............ *B60C 11/0302* (2013.01); *B60C 5/00* (2013.01); *B60C 9/02* (2013.01); *B60C 11/0304* (2013.01);
(Continued)

(58) Field of Classification Search
CPC ............. B60C 11/0302; B60C 11/1392; B60C 11/1218; B60C 11/124; B60C 11/12; B60C 2011/1295; B60C 19/001; B60C 13/001

See application file for complete search history.

(56) References Cited

U.S. PATENT DOCUMENTS

| 3,630,077 A | 12/1971 | Boileau |
| 3,909,906 A | 10/1975 | MacMillan |

(Continued)

FOREIGN PATENT DOCUMENTS

| CN | 101277828 | 10/2008 |
| CN | 101296807 | 10/2008 |

(Continued)

OTHER PUBLICATIONS

Machine translation for German 4319713 (Year: 2022).*

(Continued)

*Primary Examiner* — Steven D Maki
(74) *Attorney, Agent, or Firm* — Shaun J. Fox; Bryan J. Jaketic

(57) ABSTRACT

A method of mounting a tire on a vehicle includes providing a tire having a first side, a second side, and a circumferential tread disposed about the tire. The first side defines a first forward rotation direction that is a rotation of the tire in a counterclockwise direction when the tire is mounted on a vehicle in a first orientation and viewed from the first side. The second side defines a second forward rotation direction of the tire that is a rotation of the tire in the counterclockwise direction when the tire is mounted on the vehicle in a second orientation opposite the first orientation and viewed from the first side. The circumferential tread includes a plurality of tread elements. At least one of the tread elements includes a sipe arrangement that causes the tire to exhibit a first tire performance when the tire is mounted on the vehicle in the (Continued)

first orientation and rotated in the first forward rotation direction. The sipe arrangement causes the tire to exhibit a second tire performance that is different from the first tire performance when the tire is mounted on the vehicle in the second orientation and rotated in the second forward rotation direction. The method further includes mounting the tire on the vehicle in the first orientation for driving the vehicle in a first set of conditions, and mounting the tire on the vehicle in the second orientation for driving the vehicle in a second set of conditions.

8 Claims, 15 Drawing Sheets

Related U.S. Application Data

(60) Provisional application No. 61/739,320, filed on Dec. 19, 2012.

(51) Int. Cl.
   *B60C 9/02* (2006.01)
   *B60C 11/03* (2006.01)
   *B60C 11/13* (2006.01)
   *B60C 13/00* (2006.01)
   *B60C 19/00* (2006.01)

(52) U.S. Cl.
   CPC ........ *B60C 11/1218* (2013.01); *B60C 11/124* (2013.01); *B60C 11/1392* (2013.01); *B60C 13/001* (2013.01); *B60C 19/001* (2013.01); *B60C 11/12* (2013.01); *B60C 2011/295* (2013.01); *Y10T 29/49496* (2015.01)

(56) References Cited

U.S. PATENT DOCUMENTS

| | | | |
|---|---|---|---|
| 3,942,370 A | | 3/1976 | Grosch et al. |
| 4,134,362 A | | 1/1979 | Rush |
| 4,252,589 A | | 2/1981 | Hayakawa et al. |
| 4,298,046 A | | 11/1981 | Herbelleau et al. |
| 4,343,342 A | | 8/1982 | McDonald |
| 4,547,139 A | | 10/1985 | Hershberger |
| 4,641,696 A | | 2/1987 | Semin et al. |
| 4,714,099 A | | 12/1987 | McGlashen |
| 4,865,101 A | | 9/1989 | Williams |
| 4,984,616 A | | 1/1991 | Shepler et al. |
| 5,152,854 A | | 10/1992 | Matsumoto |
| 5,160,383 A | | 11/1992 | Gartland et al. |
| 5,200,008 A | | 4/1993 | Enterline et al. |
| 5,211,779 A | * | 5/1993 | Tomioka ............... B60C 13/001 152/902 |
| 5,230,598 A | * | 7/1993 | Steves, Jr. ............. B60B 29/002 414/427 |
| 5,263,525 A | | 11/1993 | Yamashita |
| 5,264,066 A | | 11/1993 | Lundell |
| 5,277,742 A | | 1/1994 | Scheurer |
| 5,353,854 A | * | 10/1994 | Landers ............... B60C 11/0302 152/209.15 |
| 5,358,772 A | | 10/1994 | Nakagawa et al. |
| 5,826,319 A | | 10/1998 | Colwell et al. |
| 5,896,905 A | | 4/1999 | Lurois |
| 5,905,199 A | | 5/1999 | Scarpetti et al. |
| 6,588,472 B2 | | 7/2003 | Pirotte |
| 6,609,548 B2 | | 8/2003 | Kousaie et al. |
| 6,619,563 B2 | | 9/2003 | Eromaki |
| 6,715,522 B1 | | 4/2004 | Wada |
| 6,823,912 B2 | | 11/2004 | Oohigashi |
| 6,948,246 B2 | | 9/2005 | Kogure et al. |
| 6,991,015 B2 | | 1/2006 | Kuroda |
| 7,093,758 B2 | | 8/2006 | Oyama et al. |
| 7,128,942 B2 | | 10/2006 | Suzuki |
| 7,245,206 B2 | | 7/2007 | Gronau et al. |
| 7,267,148 B2 | | 9/2007 | Merino-Lopez et al. |
| D556,127 S | * | 11/2007 | Iwabuchi ..................... D12/605 |
| 7,350,552 B2 | | 4/2008 | Radulescu |
| 7,387,144 B2 | | 6/2008 | Byrne |
| 7,628,880 B2 | | 12/2009 | Vervaet |
| 7,849,895 B2 | | 12/2010 | Fukunaga |
| 8,511,358 B2 | | 8/2013 | Murata |
| 2003/0047262 A1 | | 3/2003 | Kousaie et al. |
| 2003/0211273 A1 | | 11/2003 | Perry et al. |
| 2005/0224153 A1 | | 10/2005 | Speyer et al. |
| 2005/0269003 A1 | | 12/2005 | Fuji et al. |
| 2006/0266456 A1 | | 11/2006 | Speyer et al. |
| 2008/0230161 A1 | | 9/2008 | Ishiyama |
| 2008/0302457 A1 | * | 12/2008 | Byrne ................... B60C 11/032 152/209.18 |
| 2009/0000713 A1 | * | 1/2009 | Stuhldreher ............ B60C 11/12 152/209.24 |
| 2009/0008015 A1 | | 1/2009 | Itoi |
| 2009/0151856 A1 | | 6/2009 | Balogh et al. |
| 2009/0183815 A1 | | 7/2009 | Hiroishi |
| 2010/0000649 A1 | | 1/2010 | Iwabuchi |
| 2010/0018624 A1 | | 1/2010 | Miyasaka |
| 2010/0051159 A1 | | 3/2010 | Fujioka |
| 2010/0071855 A1 | | 3/2010 | Immler |
| 2010/0116392 A1 | | 5/2010 | Yamakawa |
| 2010/0139826 A1 | | 6/2010 | Matsumoto |
| 2012/0160383 A1 | * | 6/2012 | De Barsy ............ B60C 11/1272 152/209.18 |

FOREIGN PATENT DOCUMENTS

| | | | |
|---|---|---|---|
| CN | 101298227 | | 11/2008 |
| CN | 101746223 | | 6/2010 |
| CN | 202319755 | | 7/2012 |
| DE | 8707957 | | 9/1987 |
| DE | 4319713 | | 12/1994 |
| DE | 4319713 A1 | * | 12/1994 |
| EP | 194069 A2 | * | 9/1986 |
| EP | 0426068 | | 5/1991 |
| EP | 1283115 | | 2/2003 |
| EP | 1568515 | | 8/2005 |
| EP | 1918130 | | 5/2008 |
| EP | 2607105 A1 | | 6/2013 |
| JP | 02-283505 | | 11/1990 |
| JP | AH02-283505 e | | 11/1990 |
| JP | 03-139404 A | * | 6/1991 |
| JP | AH03-143706 e | | 6/1991 |
| JP | H03186405 | | 8/1991 |
| JP | 05-310010 | | 11/1993 |
| JP | 05-310010 A | * | 11/1993 |
| JP | H062864 | | 10/1994 |
| JP | 08-244419 A | * | 9/1996 |
| JP | 09-175114 | | 7/1997 |
| JP | 09-175114 A | * | 7/1997 |
| JP | H1007810 | | 3/1998 |
| JP | 2002002233 | | 1/2002 |
| JP | 2002178713 | | 6/2002 |
| JP | 2002274120 | | 9/2002 |
| JP | 4428914 | | 3/2010 |
| JP | 2010531273 | | 9/2010 |
| JP | 2011183952 | | 9/2011 |
| JP | 2012218596 | | 11/2012 |
| KR | 10-2010-0051078 | | 5/2010 |
| RU | 2388617 | | 5/2010 |
| WO | WO-99/17943 A1 | * | 4/1999 |
| WO | WO9948707 | | 9/1999 |
| WO | 2010063751 | | 6/2010 |

OTHER PUBLICATIONS

Machine translation for Japan 08-244419 (Year: 2022).*
Machine translation for Japan 03-139404 (Year: 2024).*
Machine translation for Japan 05-310010 (Year: 2024).*
Machine translation for Japan 09-175114 (Year: 2024).*
Office Action; Corresponding JP Application 2015-549457; Dated May 25, 2016 (Translated by JP Associate Taiyo, Nakajima & Kato).

(56) References Cited

OTHER PUBLICATIONS

Supplemental Partial Search Report; corresponding EP Application 13865777; Dated Sep. 15, 2016.
Final Office Action; Parent U.S. Appl. No. 14/653,009, filed Jun. 17, 2015; Dec. 13, 2018.
Office Action; Parent U.S. Appl. No. 14/653,009, filed Jun. 17, 2015; Mar. 26, 2018.
Office Action; Parent U.S. Appl. No. 14/653,009, filed Jun. 17, 2015; Mar. 21, 2019.
Machine Translation of German 4319713 (Year: 2018).
Translation of Office Action; corresponding KR Application 10-2015-7016835; Dated Jun. 28, 2016.
Machine Translation of Japan 02-283505 (Year: 2018).
Machine Translation of Japan 05-310010 (Year: 2018).
Machine Translation of Japan 09-175114 (Year: 2018).
Office Action with English Comments from Japanese Patent Application No. 2015-549457; 4 pp. (Nov. 24, 2015).
Search Report; corresponding KR Application 10-2015-7016835; Dated Dec. 11, 2015 (Translation).
Search Report; corresponding KR Application 10-2015-7016835; Dated Dec. 11, 2015 (Original).
Second Office Action; corresponding CN Application 201380066321.5; Dated Oct. 17, 2016.
International Preliminary Report on Patentability and Written Opinion; Corresponding PCT Application No. PCT/US2013/074038; Authorized Officer Nickitas-Etienne, Athina; Jun. 23, 2015.
Search Report; corresponding RU Application 2015/128492/11; Dated Oct. 13, 2015.
Office Action; corresponding CN Application 201380066321.5; Dated Apr. 15, 2016.
Song, Ho Keun, International Search Report for PCT/US13/74038, 4 pp. (Mar. 25, 2014).
European Search Report and Opinion; Corresponding EP Application No. 19190785.6; date completed Dec. 2, 2019.

\* cited by examiner

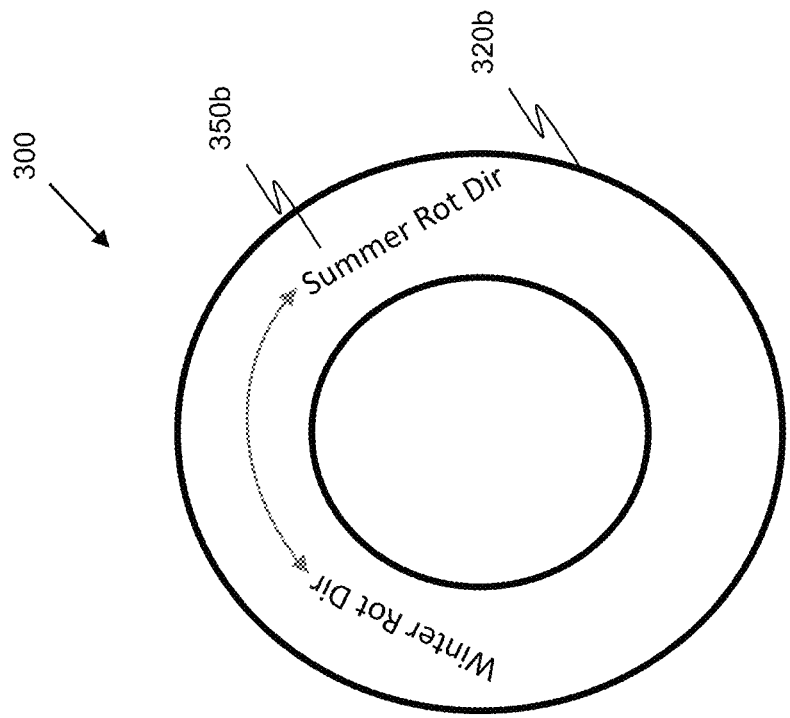
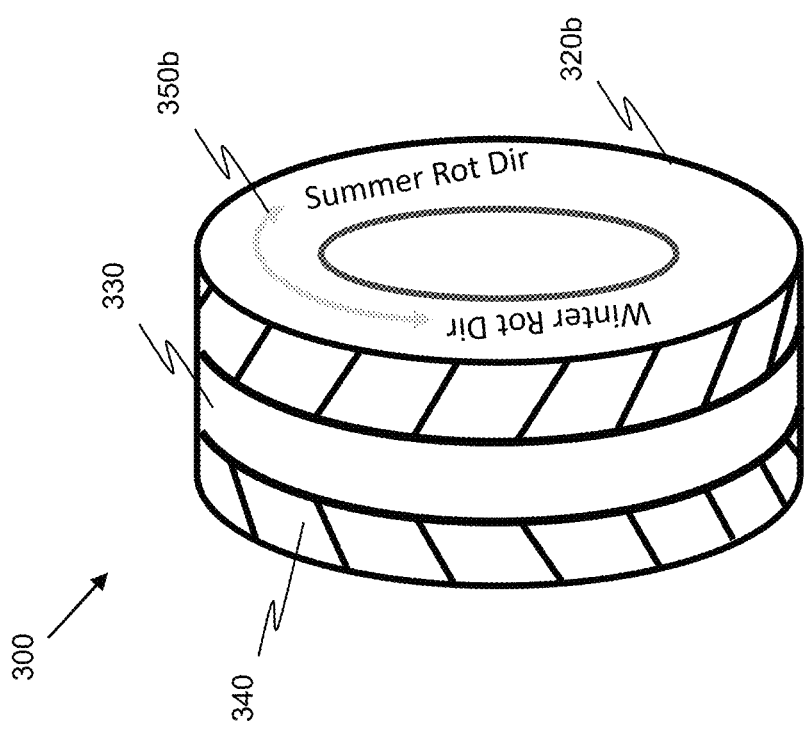

TIRE WITH BI-DIRECTIONAL PERFORMANCE

CROSS-REFERENCE TO RELATED APPLICATIONS

The present disclosure is a divisional of U.S. patent application Ser. No. 14/653,009, filed on Jun. 17, 2015, which is a 371 national stage entry of PCT/US2013/074038, filed on Dec. 10, 2013, which in turn claims the benefit of U.S. Provisional Patent Application No. 61/739,320, filed on Dec. 19, 2012. The disclosures of these references are incorporated herein in their entirety.

FIELD OF INVENTION

The present disclosure relates to the field of tire performance and tire mounting. More particularly, the present disclosure relates to tires having a different characteristic when rotated in different directions or mounted in different orientation.

BACKGROUND

Tires of different tread patterns and construction are known in the art. Both symmetric and asymmetric tread patterns may be configured to optimize certain features, such as braking performance, wet handling, dry handling, snow handling, traction, wear, noise reduction, and rolling resistance. The position and orientation of carcass plies and other elements may also be configured to optimize such features. Tires can be categorized into symmetric tires, asymmetric tires and directional tires. Symmetric tires have no preferred mounting method while asymmetric tires have a preferred outboard face and directional tires have a preferred rolling direction.

Many vehicles have different performance needs for tires on a front axle versus tires on a rear axle. The front axle may support a greater portion of the weight of the vehicle. In some instances, the front axle may support 60% of the weight of the vehicle. Additionally, in front wheel drive tires, the rear tires only contribute to braking, and contribute no driving force. Similarly, in rear wheel drive tires, the front tires contribute only to braking and contribute no driving force.

Additionally, the radial and lateral forces may be distributed differently in the front and rear tires. Further, the camber of front tires may be different from that of rear tires in some vehicles. This causes different parts of a tread pattern to engage a rolling surface on a front tire versus a rear tire.

FIG. 1 is a sample histogram illustrating the distribution of fore/aft forces on front and rear tires of exemplary rear wheel drive vehicles driven on a simulated road course. The histogram is not meant to illustrate properties of a specific tire or specific car, but is presented here to illustrate some of the different forces exerted on front tires versus rear tires.

The illustrated example shows forces on two different cars. The x-axis represents a ratio of the fore-aft force to the static front load of a tire. The negative numbers on the axis represent a braking force and the positive numbers represent a driving force. The y-axis represents the percentage of each occurrence.

As can be seen from FIG. 1, rear wheel drive vehicles often exert small braking forces on the front tires, and may occasionally exert larger braking forces on the front tires. However, as one would expect, rear wheel drive tires do not any exert driving force on the front tires.

By contrast, FIG. 1 illustrates that rear wheel drive vehicles often exert small driving forces on the rear tires, and occasionally exert larger driving forces on the rear tires. Rear wheel drive vehicles may also exert small to medium braking forces on the rear tires.

Although the histogram of FIG. 1 is specific to a given simulated road course, it should be understood that while changes to the road course would affect the histogram, the general differences between front and rear tires would still hold.

While "directional tires" are known in the art, it was not generally known how such tires would perform in both a clockwise and counterclockwise direction. Therefore, a sample of existing directional tires were tested on a flat belt tire test machine, which closely controls and sweeps through a matrix of slip rates and loads while recording reaction forces and moments at the tire/wheel assembly center. Table 1 shows the Peak Fx metric relating to dry traction calculated from the resulting data.

TABLE 1

|  | Tire A: Non Directional | | | Tire B: Directional AS | | | Tire C: Directional Summer | | | Tire D: Directional AS | | | Tire E: Directional Summer | | |
| --- | --- | --- | --- | --- | --- | --- | --- | --- | --- | --- | --- | --- | --- | --- | --- |
|  | Rolling CW | Rolling CCW | Diff (%) | Rolling CW | Rolling CCW | Diff (%) | Rolling CW | Rolling CCW | Diff (%) | Rolling CW | Rolling CCW | Diff (%) | Rolling CW | Rolling CCW | Diff (%) |
| Braking Peak Fx | 3905 | 3907 | −0.06 | 4097 | 4221 | −2.99 | 4133 | 4158 | −0.60 | 4291 | 4215 | 1.78 | 5048 | 4968 | 1.60 |
| Driving Peak Fx | 4323 | 4391 | −1.55 | 4748 | 4629 | 2.53 | 4760 | 4833 | −1.52 | 4799 | 4925 | −2.59 | 5338 | 5318 | 0.38 |

In Table 1, Peak Fx is the greatest longitudinal force on the slip ratio versus a longitudinal force (N) curve. Peak Fx is known by those skilled in the arts to correlate with traction performance.

As can be seen in Table 1, although the directional tires are configured to be rotated in a specific direction, the differences in peak Fx due to changing the rolling direction were never greater than 3%. Some of the 3% difference is likely due to the error in the testing/measurement, because even the Non Directional Tire A showed differences. Accordingly, current directional tires do not display a significant difference in dry driving or braking traction to affect a significant change in on vehicle performance based on tire rolling direction.

SUMMARY OF THE INVENTION

In one embodiment, a method of mounting a plurality of tires on a vehicle having a front axle and a rear axle is disclosed. The method includes providing four tires, including a first tire, a second tire, a third tire, and a fourth tire. Each of the four tires has a first side, a second side, and a circumferential tread disposed about the tire. The first side of each of the four tires is substantially the same. The second side of each of the four tires is substantially the same. The circumferential tread of each of the four tires is substantially the same. The circumferential tread of each of the four tires has a plurality of tread elements, with each of the tread elements having an asymmetric sipe arrangement that causes the tire to exhibit a first tire performance when the tire is mounted on a vehicle in a first orientation and rotated in a first forward rotation direction, and a second tire performance that is different from the first tire performance when the tire is mounted on the vehicle in a second orientation and rotated in a second forward rotation direction. The tire performance is selected from braking, dry driving traction, noise, wear performance, and snow traction performance. The method further includes mounting the first tire on a first wheel, mounting the second tire on a second wheel, mounting the third tire on a third wheel, and mounting the fourth tire on a fourth wheel. The method also includes mounting the first wheel on a left end of a front axle of the vehicle in the first orientation, such that the first side of the first tire faces away from the vehicle. The method further includes mounting the second wheel on a right end of the front axle of the vehicle in the first orientation, such that the first side of the second tire faces away from the vehicle. The method also includes mounting the third wheel on a left end of a rear axle of the vehicle in the first orientation, such that the second side of the third tire faces away from the vehicle. The method further includes mounting the fourth wheel on a right end of the rear axle of the vehicle in the first orientation, such that the second side of the fourth tire faces away from the vehicle.

In another embodiment, a method of mounting a plurality of tires on a vehicle having a front axle and a rear axle is disclosed. The method includes providing four tires, including a first tire, a second tire, a third tire, and a fourth tire. Each of the four tires has a first side, a second side, and a circumferential tread disposed about the tire and having discrete rotational asymmetry of the second order that causes the tire to exhibit a first tire performance when the tire is mounted on a vehicle in a first orientation and rotated in a first forward rotation direction, and a second tire performance that is different from the first tire performance when the tire is mounted on the vehicle in a second orientation and rotated in a second forward rotation direction. The first side of each of the four tires is substantially the same. The second side of each of the four tires is substantially the same. The circumferential tread of each of the four tires is substantially the same. The method further includes mounting the first tire on a first wheel, mounting the second tire on a second wheel, mounting the third tire on a third wheel, and mounting the fourth tire on a fourth wheel. The method also includes mounting the first wheel on a left end of a front axle of the vehicle, such that the first side of the first tire faces away from the vehicle and such that the first tire is in the first orientation. The method further includes mounting the second wheel on a right end of the front axle of the vehicle, such that the second side of the second tire faces away from the vehicle and such that the second tire is in the first orientation. The method also includes mounting the third wheel on a left end of a rear axle of the vehicle, such that the first side of the third tire faces away from the vehicle and such that the third tire is in the first orientation. The method further includes mounting the fourth wheel on a right end of the rear axle of the vehicle, such that the second side of the fourth tire faces away from the vehicle and such that the fourth tire is in the first orientation. The method also includes removing the first wheel and first tire from the front axle of the vehicle. The method further includes removing the second wheel and second tire from the front axle of the vehicle, removing the third wheel and third tire from the rear axle of the vehicle, and removing the fourth wheel and fourth tire from the rear axle of the vehicle. The method also includes mounting the first wheel and first tire on the right end of the rear axle of the vehicle, such that the first side of the first tire faces away from the vehicle and such that the first tire is in the second orientation. The method further includes mounting the second wheel and second tire on the left end of the rear axle of the vehicle, such that the second side of the second tire faces away from the vehicle and such that the second tire is in the second orientation. The method also includes mounting the third wheel and third tire on the right end of the front axle of the vehicle, such that the second side of the third tire faces away from the vehicle and such that the third tire is in the second orientation. The method further includes mounting the fourth wheel and fourth tire on the left end of the front axle of the vehicle, such that the second side of the fourth tire faces away from the vehicle and such that the fourth tire is in the second orientation.

In yet another embodiment, a method of mounting a tire on a vehicle includes providing a tire having a first side, a second side, and a circumferential tread disposed about the tire. The first side defines a first forward rotation direction that is a rotation of the tire in a counterclockwise direction when the tire is mounted on a vehicle in a first orientation and viewed from the first side. The second side defines a second forward rotation direction of the tire that is a rotation of the tire in the counterclockwise direction when the tire is mounted on the vehicle in a second orientation opposite the first orientation and viewed from the first side. The circumferential tread includes a plurality of tread elements. At least one of the tread elements includes a sipe arrangement that causes the tire to exhibit a first tire performance when the tire is mounted on the vehicle in the first orientation and rotated in the first forward rotation direction. The sipe arrangement causes the tire to exhibit a second tire performance that is different from the first tire performance when the tire is mounted on the vehicle in the second orientation and rotated in the second forward rotation direction. The method further includes mounting the tire on the vehicle in the first orientation for driving the vehicle in a first set of conditions, and mounting the tire on the vehicle in the second orientation for driving the vehicle in a second set of conditions.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 7 is a schematic drawing of a perspective view of an alternative embodiment of a tire 300 having first and second rolling directions;

FIG. 8 is a schematic drawing of a front view of the tire 300 of FIG. 7;

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Bead" refers to the part of the tire that contacts the wheel and defines a boundary of the sidewall.

"Carcass ply" refers to a structural member that connects the bead to a tread, and may be continuous or discrete.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated in this disclosure with reference to a top view of a vehicle, with respect to a longitudinal axis of the vehicle. The terms "inward" and "inwardly" refer to a general direction towards the longitudinal axis of the vehicle, whereas "outward" and "outwardly" refer to a general direction away from the longitudinal axis of the vehicle. Thus, when relative directional terms such as "inner" and "outer" are used in connection with an element, the "inner" element is spaced closer to the longitudinal axis of the vehicle than the "outer" element. Similarly, the terms "left" and "right" are stated in reference to a top view of the vehicle on which tires are mounted, with respect to a longitudinal axis of the vehicle. The terms "front" and "rear" are also stated in reference to a vehicle on which tires are mounted.

Figure 1:
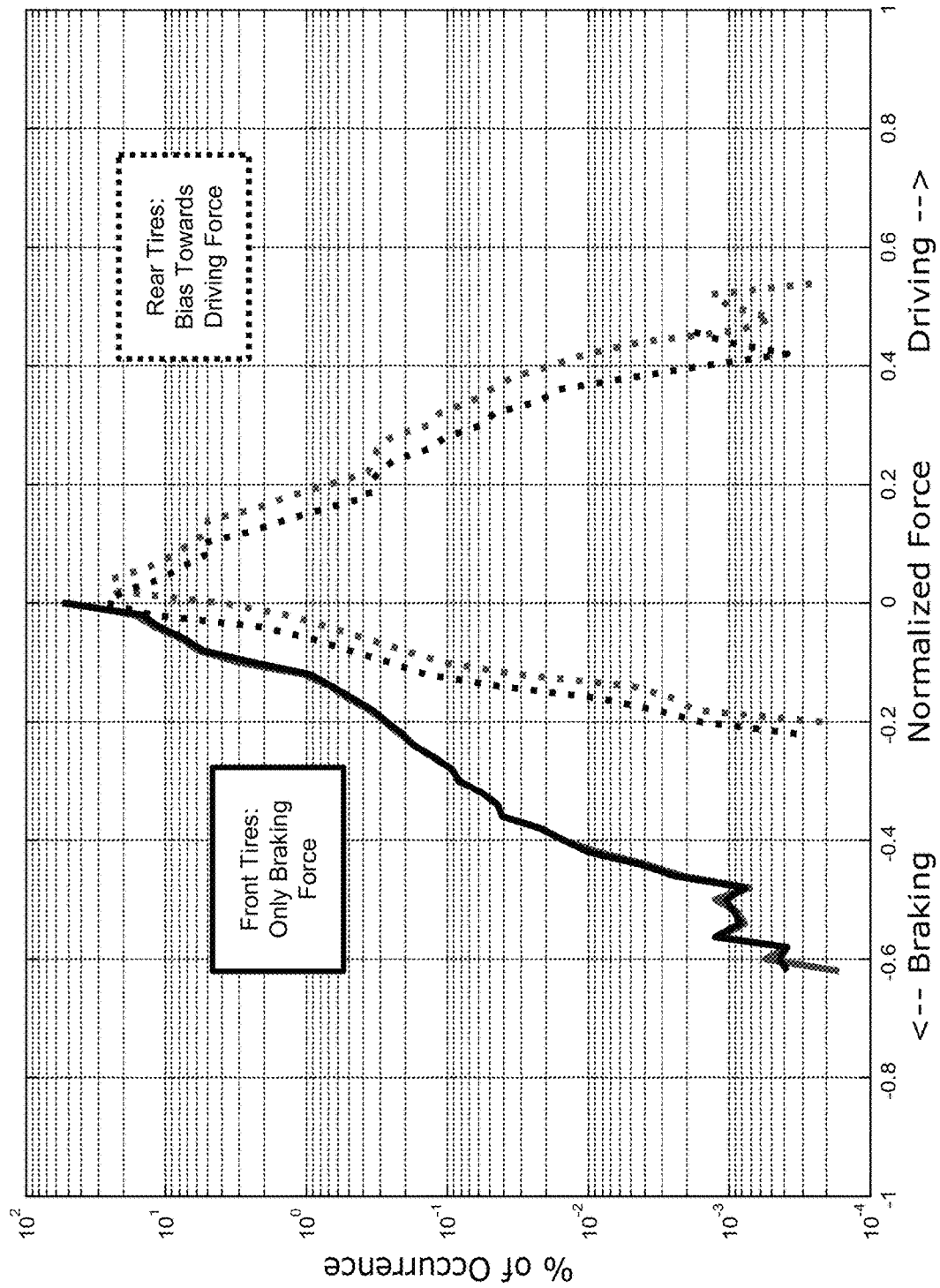
FIG. 1 is a sample histogram illustrating the distribution of fore/aft forces on front and rear tires of exemplary rear wheel drive vehicles.
Figure 3:
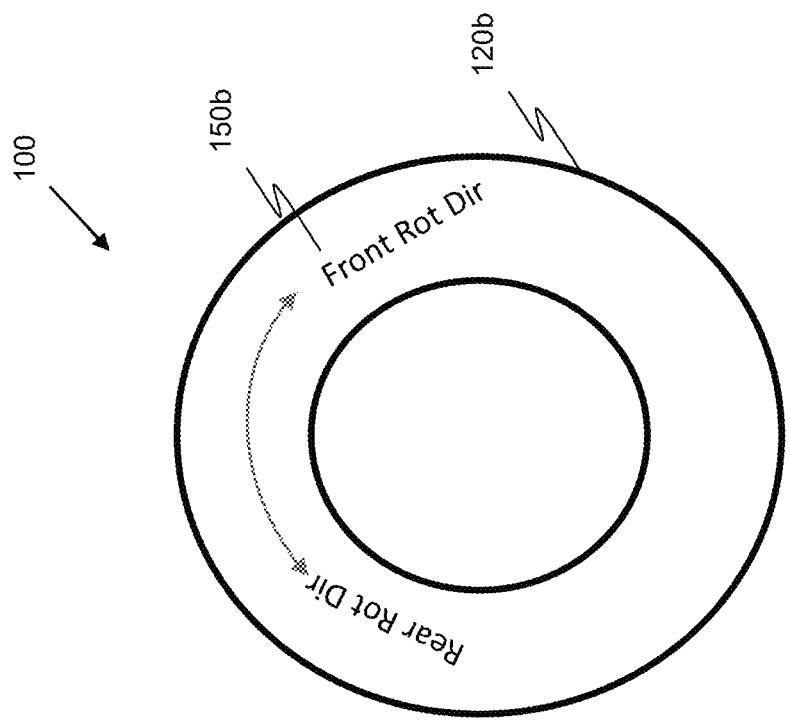
FIG. 3 is a schematic drawing of a front view of the tire 100 of FIG. 2.
Figure 2:
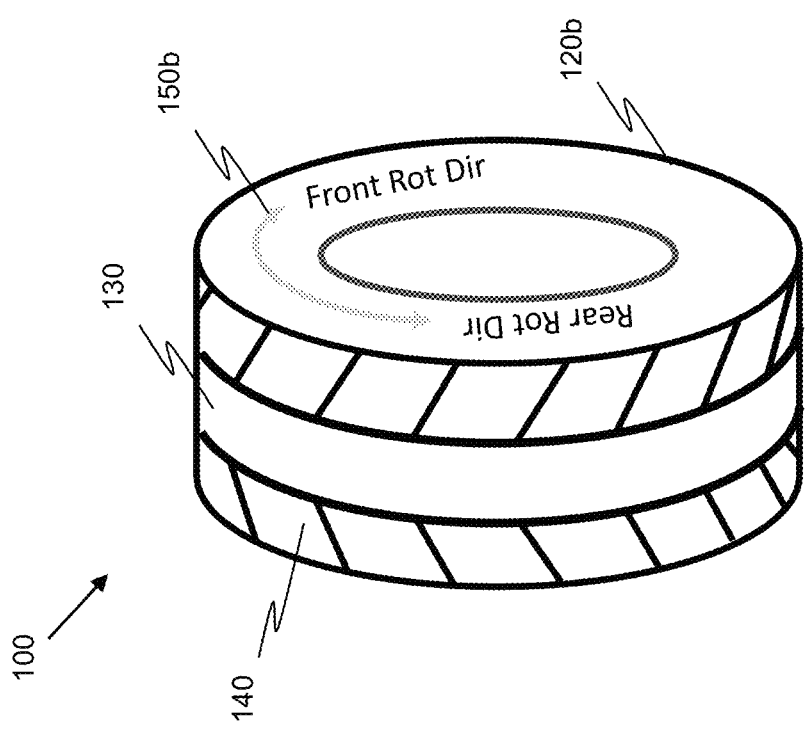
FIG. 2 is a schematic drawing of a perspective view of one embodiment of a tire 100 having first and second rolling directions.
Figure 4:
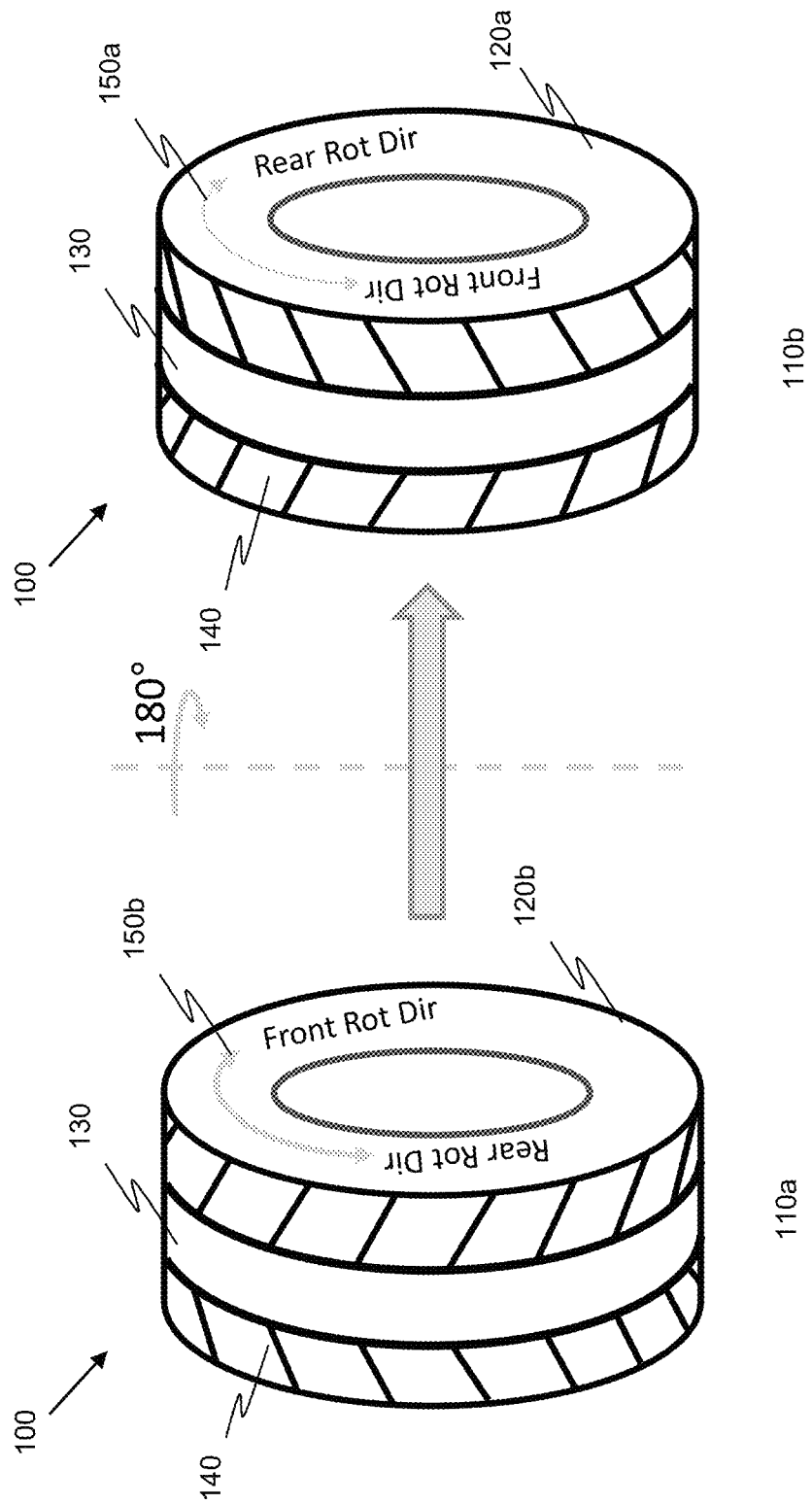
FIG. 4 is a schematic drawing of a multi-perspective view of the tire 100 of FIG. 2, showing the tire in a first orientation and a second orientation.

FIGS. 2 and 3 show a perspective view and side view, respectively, of a schematic drawing of one embodiment of a tire 100 having an axle specific rolling direction. FIG. 4 shows a multi-perspective view of the tire 100 in a first orientation 110a and a second orientation 110b. The tire 100 is described in reference to all of these figures.

The tire 100 includes a first and second bead portion (not shown), a first sidewall 120a, and a second sidewall 120b. The tire 100 has two rotation directions. When the tire is viewed from the second sidewall 120b (as shown in FIG. 3), the first rotation direction of the tire 100 is in the clockwise direction and the second rotation direction of the tire 100 is in the counterclockwise direction.

The tire 100 further includes at least one carcass ply (not shown) extending from the first bead portion to the second bead portion, a circumferential belt disposed above the carcass ply (not shown), and a circumferential tread 130 disposed above the belt. The circumferential tread 130 has a tread pattern shown schematically at 140. In one embodiment, the tread pattern 140 has discrete rotational asymmetry of the second order, which causes the tire 100 to be directional. Therefore, when the tire 100 is in the first orientation 110a, the tread pattern 140 has a first appearance, and when the tire 100 is placed in the second orientation 110b, the reversed tread pattern 140 has a second appearance different from the first appearance.

The asymmetry of the tread pattern may cause the tread to exhibit different properties when the tire 100 is rotated in the first direction versus the second direction. The tread pattern and the position and orientation of the carcass ply may be selected such that desirable properties for a front tire are exhibited when the tire 100 is rotated in the first direction, and desirable properties for a rear tire are exhibited when the tire 100 is rotated in the second direction.

For example, the tread pattern may be selected such that when the tire is rotated in the first rotation direction, the circumferential tread exhibits a first braking performance and a first driving traction performance, and when the tire is rotated in the second direction, the circumferential tread exhibits a second braking performance that is lower than the first braking performance and a second driving traction performance that is higher than the first driving traction performance. In rear wheel drive vehicles, it may be more advantageous for the rear tires to exhibit higher driving traction performance. In front wheel drive vehicles, it may be more advantageous for the front tires to exhibit higher driving traction performance.

In another example, the tread pattern may be selected such that the circumferential tread exhibits a first wear performance when rotated in the first direction, and a second wear performance different from the first wear performance when rotated in the second direction. For example, in front wheel drive vehicles, front tires tend to wear faster. In rear wheel drive tires, rear tires tend to wear faster. The tread pattern may be selected to reduce the discrepancy between the wear rates of front and rear tires.

In yet another example, the tread pattern may be selected such that the circumferential tread exhibits a first snow traction performance when rotated in the first direction, and a second snow traction performance that is different from the first snow traction performance when rotated in the second direction. The tread pattern may also be selected such that other properties are affected by a change in rotation direction.

Additionally, or in the alternative, the position and orientation of the carcass ply may be selected such that the carcass ply causes the tire to exhibit different properties according to the rotation direction. Such differences in carcass plies may not be readily observable from the exterior of the tire, but the tire would still exhibit asymmetric properties.

In one embodiment, the first rotation direction may be indicated as a Front Rotation Direction, and the second rotation direction may be indicated as a Rear Rotation Direction on one or more locations on the tire. As can be seen in the illustrated embodiment, a first indicia $150a$ is disposed on the first sidewall $120a$ and a second indicia $150b$ is disposed on the second sidewall $120b$ of the tire $100$. Both the first indicia $150a$ and the second indicia $150b$ include an indicator designating the first rotation direction as a front tire rotation direction and the second rotation direction as a rear tire rotation direction. While the illustrated embodiment shows arrows with a written description, it should be understood that the indicia may take any form or size.

Figure 5:
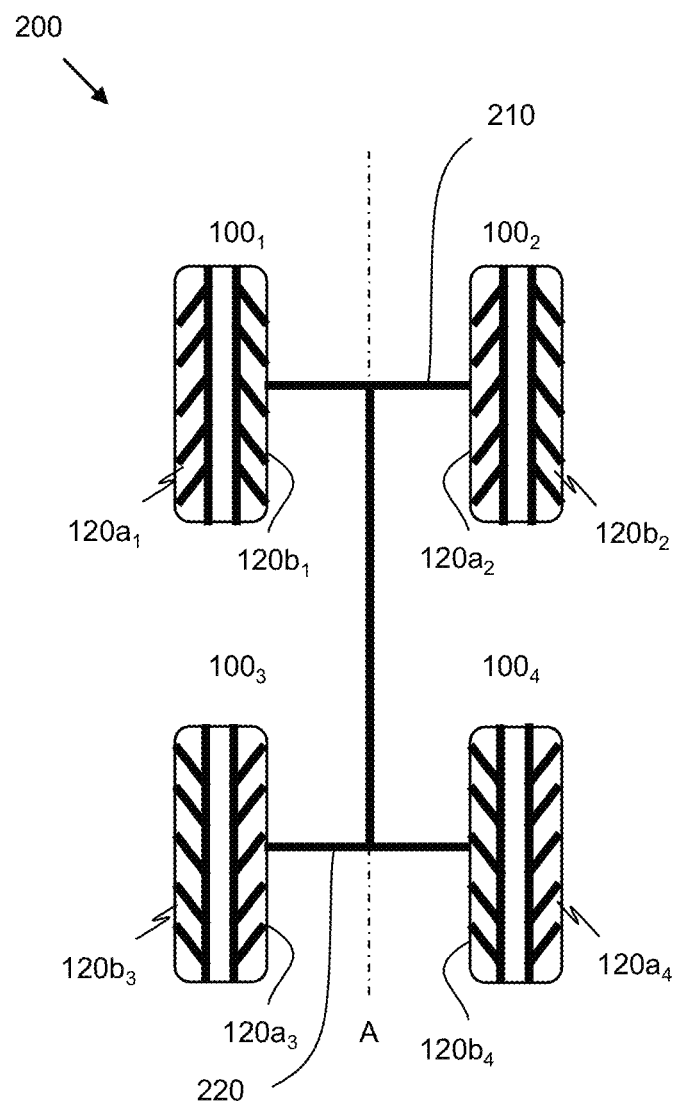
FIG. 5 is a schematic drawing illustrating a plurality of tires 100 mounted on axles of a vehicle.

Such indicia may be used to aid a person in mounting axle specific tires on a vehicle. As shown in FIG. 5, the properties of the tire $100$ may be selected so that four tires having substantially the same sidewalls, carcass plies, and circumferential tread may be mounted on a vehicle $200$ in such a way that first and second tires $100_1$, $100_2$ on a front axle $210$ exhibit different properties than third and fourth tires $100_3$, $100_4$ mounted on a rear axle $220$.

In the illustrated embodiment, the first tire $100_1$ is mounted on a first wheel (not shown), the second tire $100_2$ is mounted on a second wheel (not shown), the third tire $100_3$ is mounted on a third wheel (not shown), and the fourth tire $100_4$ is mounted on a fourth wheel (not shown). The first wheel and tire are mounted on a left end of the front axle $210$ of a vehicle $200$, such that a first sidewall $120a_1$ of the first tire $100_1$ faces outwards, (i.e., away from the vehicle $200$), and a second sidewall $120b_1$ of the first tire $100_1$ faces inwards (i.e., towards the vehicle $200$). The second wheel and tire are mounted on a right end of the front axle $210$ of the vehicle $200$, such that a first sidewall $120a_2$ of the second tire $100_2$ faces inwards, and a second sidewall $120b_2$ of the second tire $100_2$ faces outwards. The third wheel and tire are mounted on a left end of the rear axle $220$ of the vehicle $200$, such that a first sidewall $120a_3$ of the third tire $100_3$ faces inwards, and a second sidewall $120b_3$ of the third tire $100_3$ faces outwards. The fourth wheel and tire are mounted on a right end of the rear axle $220$ of the vehicle $200$, such that a first sidewall $120a_4$ of the fourth tire $100_4$ faces outwards, and a second sidewall $120b_4$ of the fourth tire $100_4$ faces inwards.

It should be understood that the tires may be mounted on the vehicle in any order, and that certain steps described above may be performed concurrently or in a different order.

Figure 6:
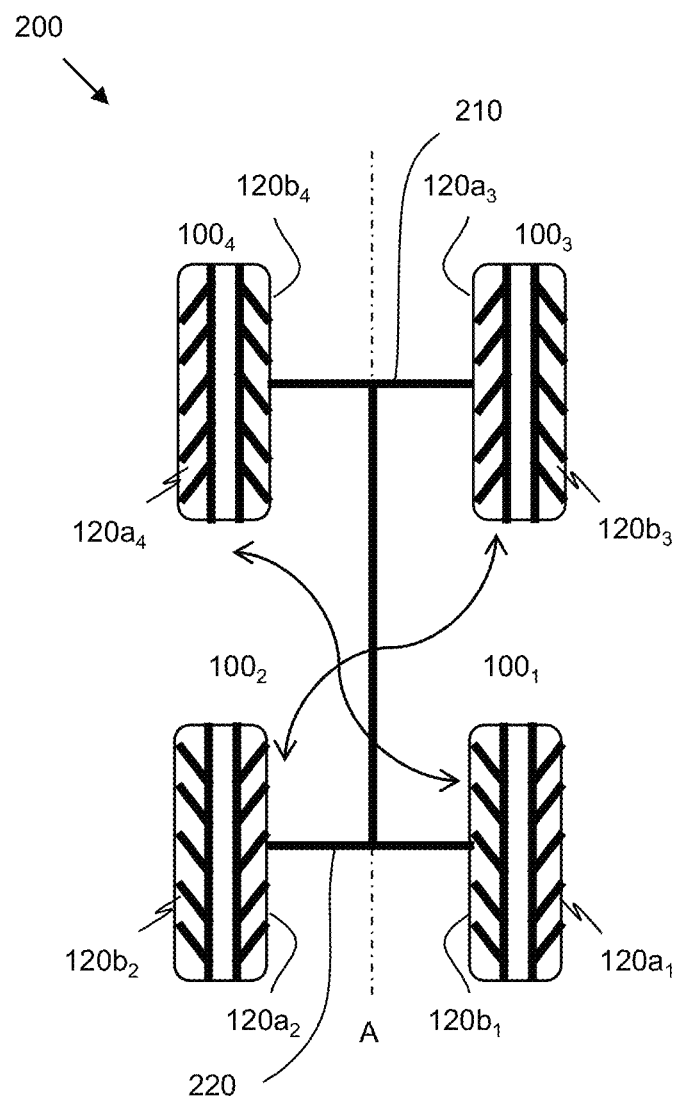
FIG. 6 is a schematic drawing illustrating service rotations of the plurality of tires 100 mounted on axles of the vehicle of FIG. 5.

When servicing the vehicle, the tires may be rotated in the manner illustrated in FIG. 6, without having to dismount the tires from the wheels. The first wheel and tire are removed from the front axle $210$ of the vehicle $200$ and the fourth wheel and tire are removed from the rear axle $220$ of the vehicle $200$. The first wheel and tire are mounted on the right end of the rear axle $220$ of the vehicle $200$, such that the first sidewall $120a_1$ of the first tire $100_1$ faces outwards, and the second sidewall $120b_1$ of the first tire $100_1$ faces inwards. The fourth wheel and tire are mounted on the left end of the front axle $210$ of the vehicle $200$, such that a first sidewall $120a_4$ of the fourth tire $100_4$ faces outwards, and a second sidewall $120b_4$ of the fourth tire $100_4$ faces inwards.

The second wheel and tire are removed from the front axle $210$ of the vehicle $200$ and the third wheel and tire are removed from the rear axle $220$ of the vehicle $200$. The second wheel and tire are mounted on the left end of the rear axle $220$ of the vehicle $200$, such that a first sidewall $120a_2$ of the second tire $100_2$ faces inwards, and a second sidewall $120b_2$ of the second tire $100_2$ faces outwards. The third wheel and tire are mounted on the right end of the front axle $210$ of the vehicle $200$, such that a first sidewall $120a_3$ of the third tire $100_3$ faces inwards, and a second sidewall $120b_3$ of the third tire $100_3$ faces outwards.

It should be understood that the steps of rotating tires may be performed in any order and that certain steps described above may be performed concurrently or in a different order. Additionally, it should also be understood that the tires may be dismounted from the wheels such that they may be remounted in any position.

Figure 9:
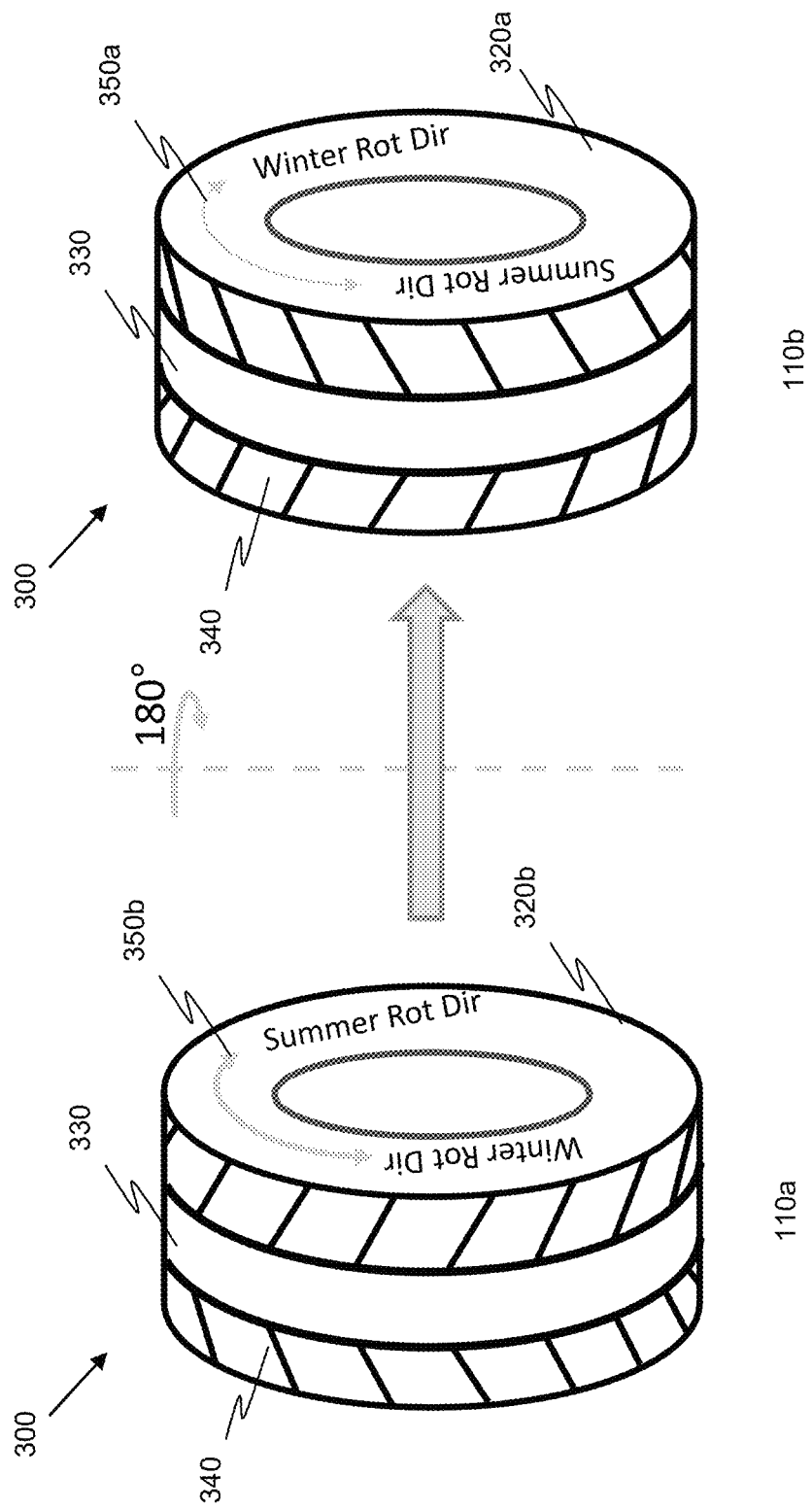
FIG. 9 is a schematic drawing of a multi-perspective view of the tire 300 of FIG. 7, showing the tire in a first orientation and a second orientation.

While FIGS. 2-6 illustrate bidirectional tires that exhibit desirable front tire characteristics when rotated in a first direction, and desirable rear tire characteristics when rotated in a second direction, bidirectional tires may also be designed to exhibit desirable summer performance characteristics when rotated in a first direction, and desirable winter performance characteristics when rotated in a second direction. FIGS. 7 and 8 show a perspective view and side view, respectively, of a schematic drawing of one embodiment of a tire $300$ having a season specific rolling direction. FIG. 9 shows a multi-perspective view of the tire $300$ in a first orientation $310a$ and a second orientation $310b$. The tire $300$ is described in reference to all of these figures.

The tire $300$ includes a first and second bead portion (not shown), a first sidewall $320a$, and a second sidewall $320b$. The tire $300$ has two rotation directions. When the tire is viewed from the second sidewall $320b$ (as shown in FIG. 8), the first rotation direction of the tire $300$ is in the clockwise direction and the second rotation direction of the tire $300$ is in the counterclockwise direction.

The tire $300$ further includes at least one carcass ply (not shown) extending from the first bead portion to the second bead portion, a circumferential belt disposed above the carcass ply (not shown), and a circumferential tread $330$ disposed above the belt. The circumferential tread $330$ has a tread pattern shown schematically at $340$. In one embodiment, the tread pattern $340$ has discrete rotational asymmetry of the second order, which causes the tire $300$ to be directional. Therefore, when the tire $300$ is in the first orientation $310a$, the tread pattern $340$ has a first appearance, and when the tire $300$ is placed in the second orientation 310b, the reversed tread pattern 340 has a second appearance different from the first appearance.

The asymmetry of the tread pattern may cause the tread to exhibit different properties when the tire 300 is rotated in the first direction versus the second direction. The tread pattern and the position and orientation of the carcass ply may be selected such that desirable properties for summer performance are exhibited when the tire 300 is rotated in the first direction, and desirable properties for winter performance are exhibited when the tire 300 is rotated in the second direction.

For example, the tread pattern may be selected such that the circumferential tread exhibits a first snow traction performance when rotated in the first direction, and a second snow traction performance that is different from the first snow traction performance when rotated in the second direction. The tread pattern may also be selected such that other properties are affected by a change in rotation direction.

In another example, the tread pattern may be selected such that when the tire is rotated in the first rotation direction, the circumferential tread exhibits a first stopping distance performance, and when the tire is rotated in the second direction, the circumferential tread exhibits a second stopping distance performance that is lower than the first stopping performance. Stopping distance performance may be more important in summer, when vehicles tend to be driven at higher speeds.

In yet another example, the tread pattern may be selected such that the circumferential tread exhibits a first wear performance when rotated in the first direction, and a second wear performance different from the first wear performance when rotated in the second direction. For example, tires tend to wear slower in the winter when they are driven over snow. The tread pattern may be selected to reduce the discrepancy between the wear rates in summer and winter.

In still another example, the tread pattern may be selected such that the circumferential tread exhibits a first noise performance when rotated in the first direction, and a second noise performance different from the first noise performance when rotated in the second direction. For example, tires tend to be quieter in the winter when they are driven over snow. The tread pattern may be selected to reduce the discrepancy between the tire noise in summer and winter.

Additionally, or in the alternative, the position and orientation of the carcass ply may be selected such that the carcass ply causes the tire to exhibit different properties according to the rotation direction. Such differences in carcass plies may not be readily observable from the exterior of the tire, but the tire would still exhibit asymmetric properties.

In one embodiment, the first rotation direction may be indicated as a Summer Rotation Direction, and the second rotation direction may be indicated as a Winter Rotation Direction on one or more locations on the tire. As can be seen in the illustrated embodiment, a first indicia 350a is disposed on the first sidewall 320a and a second indicia 350b is disposed on the second sidewall 320b of the tire 300. Both the first indicia 350a and the second indicia 350b include an indicator designating the first rotation direction as a summer rotation direction and the second rotation direction as a winter rotation direction. While the illustrated embodiment shows arrows with a written description, it should be understood that the indicia may take any form or size.

Figure 10:
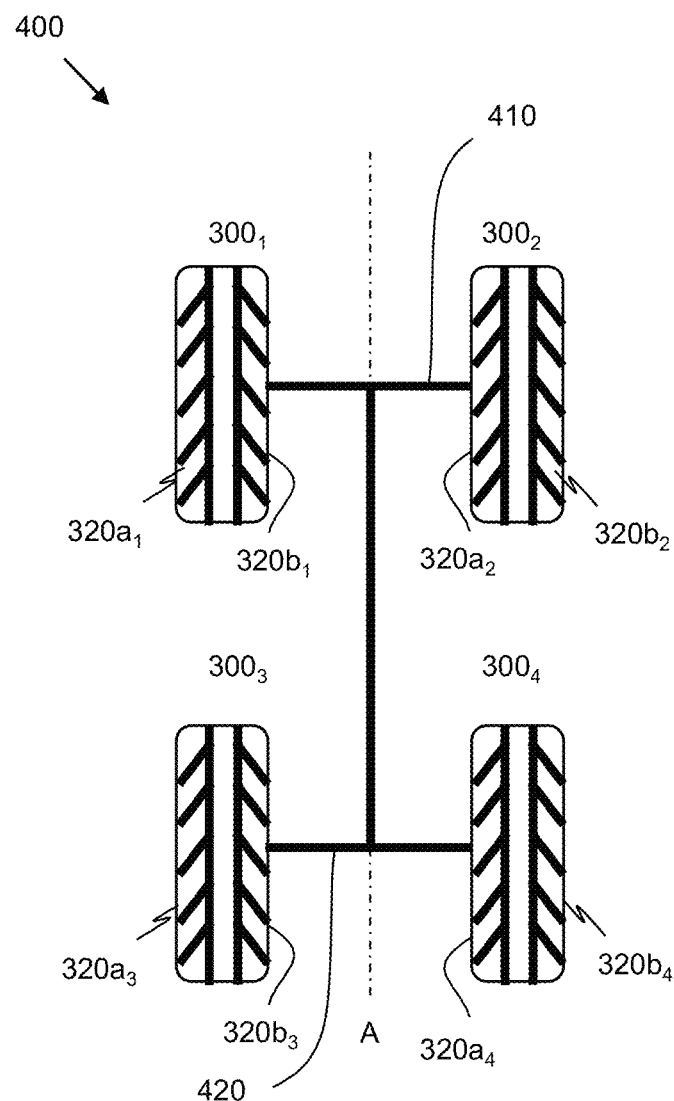
FIG. 10 is a schematic drawing illustrating a plurality of tires 300 mounted on axles of a vehicle.

Such indicia may be used to aid a person in mounting season specific tires on a vehicle. As shown in FIG. 10, the properties of the tire 300 may be selected so that four tires having substantially the same sidewalls, carcass plies, and circumferential tread may be mounted on a vehicle 400 in such a way that all tires $300_1$, $300_2$, $300_3$, $300_4$ exhibit desirable summer performance characteristics.

In the illustrated embodiment, the first tire $300_1$ is mounted on a first wheel (not shown), the second tire $300_2$ is mounted on a second wheel (not shown), the third tire $300_3$ is mounted on a third wheel (not shown), and the fourth tire $300_4$ is mounted on a fourth wheel (not shown). The first wheel and tire are mounted on a left end of the front axle 410 of a vehicle 400, such that a first sidewall $320a_1$ of the first tire $300_1$ faces outwards, (i.e., away from of the vehicle 400), and a second sidewall $320b_1$ of the first tire 3001h faces inwards (i.e., towards the vehicle 400). The second wheel and tire are mounted on a right end of the front axle 410 of the vehicle 400, such that a first sidewall $320a_2$ of the second tire $300_2$ faces inwards, and a second sidewall $320b_2$ of the second tire $300_2$ faces outwards. The third wheel and tire are mounted on a left end of the rear axle 420 of the vehicle 400, such that a first sidewall $320a_3$ of the third tire $300_3$ faces outwards, and a second sidewall $320b_3$ of the third tire $300_3$ faces inwards. The fourth wheel and tire are mounted on a right end of the rear axle 420 of the vehicle 400, such that a first sidewall $320a_4$ of the fourth tire $300_4$ faces inwards, and a second sidewall $320b_4$ of the fourth tire $100_4$ faces outwards.

It should be understood that the tires may be mounted on the vehicle in any order, and that certain steps described above may be performed concurrently or in a different order.

Figure 11:
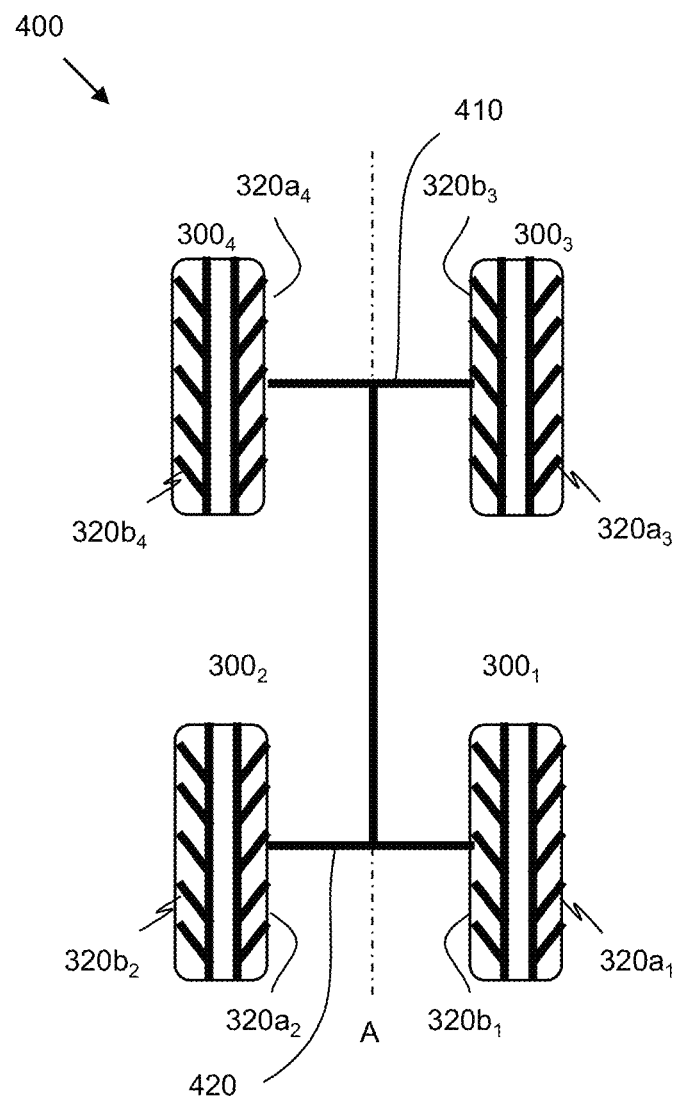
FIG. 11 is a schematic drawing illustrating service rotations of the plurality of tires 300 mounted on axles of the vehicle of FIG. 10.

To change direction of the tires when the season changes, the tires may be rotated in the manner illustrated in FIG. 11, without having to dismount the tires from the wheels. The first wheel and tire are removed from the front axle 410 of the vehicle 400 and the fourth wheel and tire are removed from the rear axle 420 of the vehicle 400. The first wheel and tire are mounted on the right end of the rear axle 420 of the vehicle 400, such that the first sidewall $320a_1$ of the first tire $300_1$ faces outwards, and the second sidewall $320b_1$ of the first tire $300_1$ faces inwards. The fourth wheel and tire are mounted on the left end of the front axle 410 of the vehicle 400, such that a first sidewall $320a_4$ of the fourth tire $300_4$ faces inwards, and a second sidewall $320b_4$ of the fourth tire $100_4$ faces outwards.

The second wheel and tire are removed from the front axle 410 of the vehicle 400 and the third wheel and tire are removed from the rear axle 420 of the vehicle 400. The second wheel and tire are mounted on the left end of the rear axle 420 of the vehicle 400, such that a first sidewall $320a_2$ of the second tire $300_2$ faces inwards, and a second sidewall $320b_2$ of the second tire $300_2$ faces outwards. The third wheel and tire are mounted on the right end of the front axle 410 of the vehicle 400, such that a first sidewall $320a_3$ of the third tire $300_3$ faces outwards, and a second sidewall $320b_3$ of the third tire $300_3$ faces inwards.

It should be understood that the steps of rotating tires may be performed in any order and that certain steps described above may be performed concurrently or in a different order. Additionally, it should also be understood that the tires may be dismounted from the wheels such that they may be remounted in any position.

Figure 12:
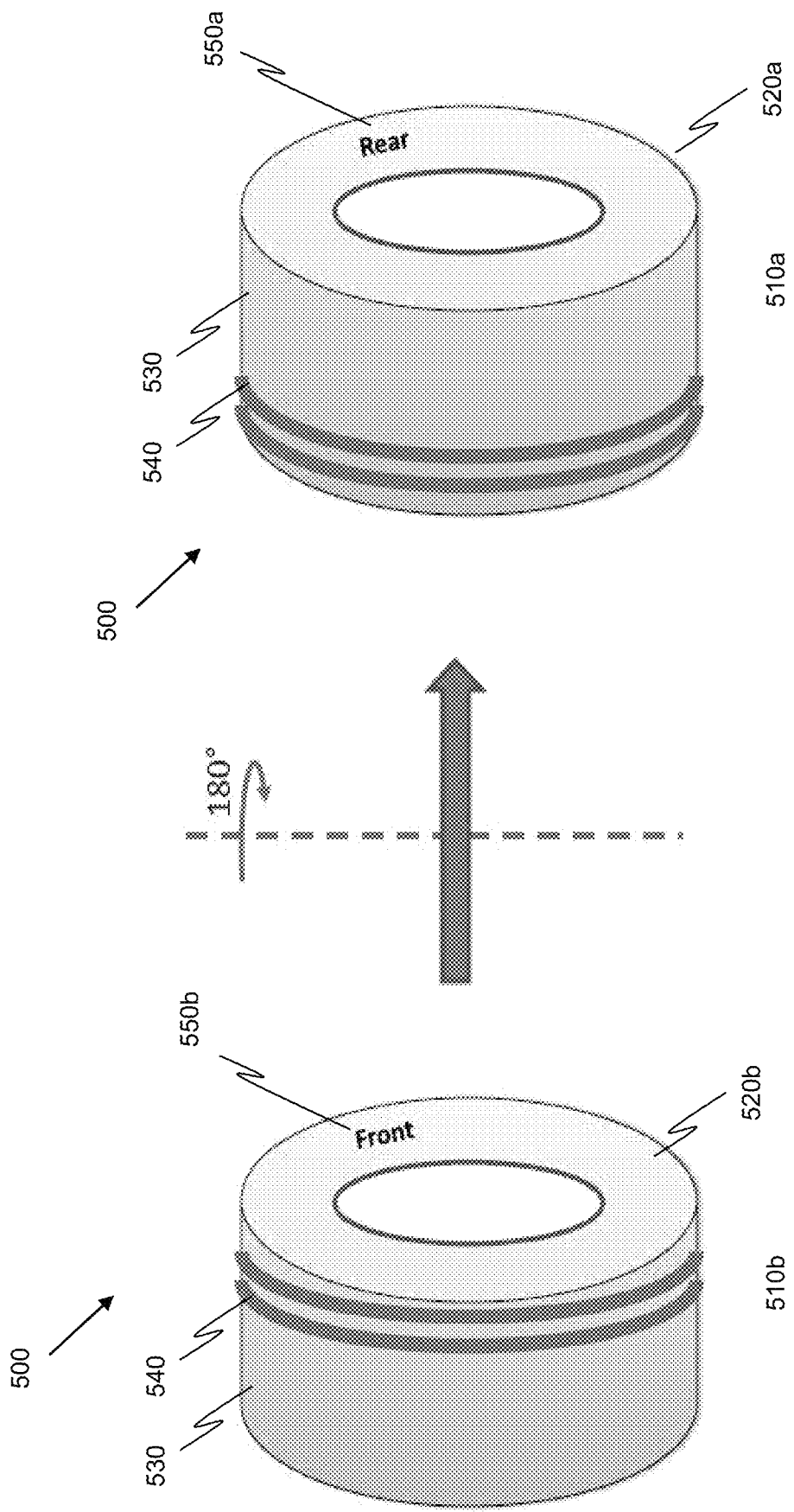
FIG. 12 is a schematic drawing of a multi-perspective view of a tire 500 having first and second mounting positions in a first orientation and a second orientation.
Figure 13:
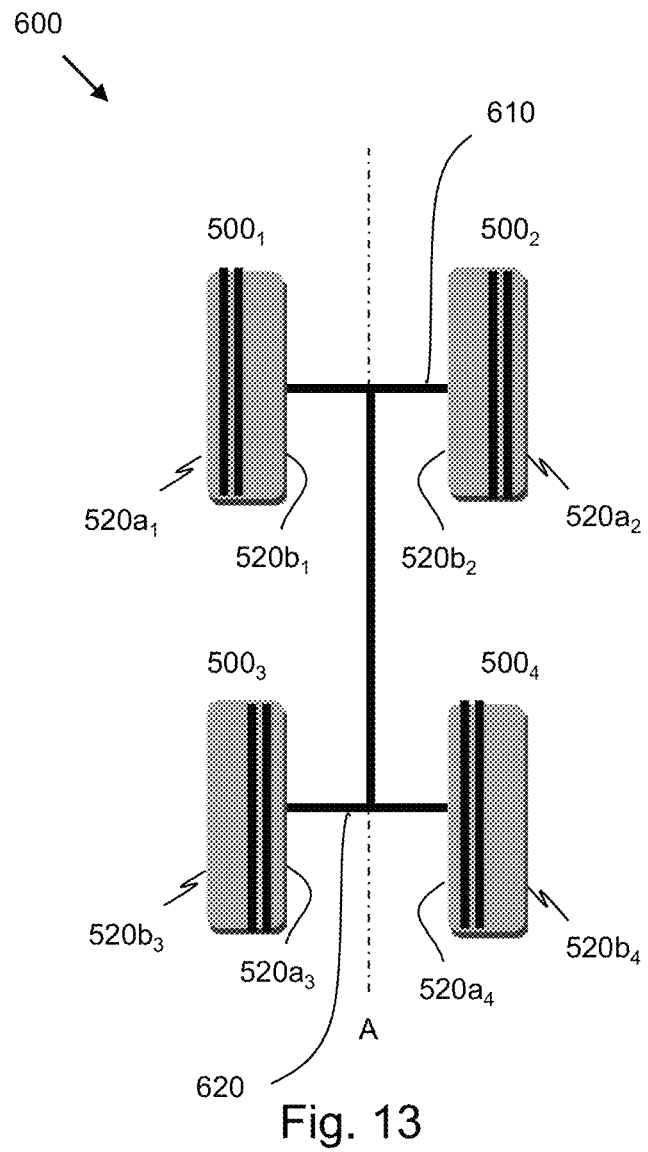
FIG. 13 is a schematic drawing illustrating a plurality of tires 500 mounted on axles of a vehicle.
Figure 14:
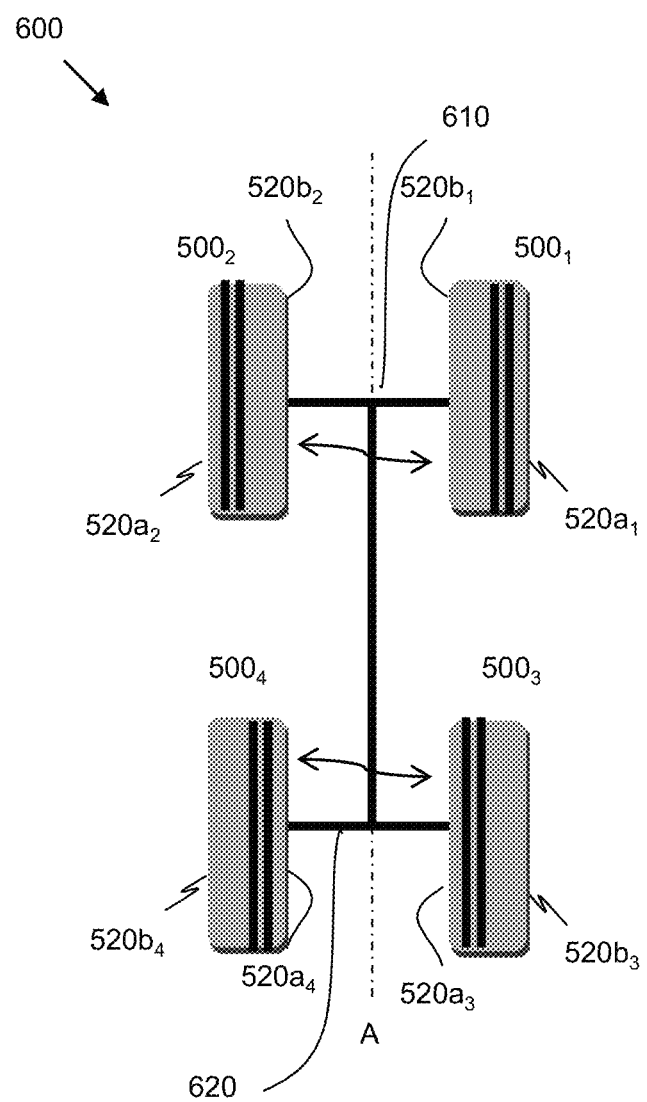
FIG. 14 is a schematic drawing illustrating service rotations of the plurality of tires 500 mounted on axles of the vehicle of FIG. 13.

FIG. 12 shows a multi-perspective view of another embodiment of a tire 500 in a first orientation 510a and a second orientation 510b. The tire 500 includes a first and second bead portion (not shown), a first sidewall 520a, and a second sidewall 520b. The first and second sidewall 520a,b define a first mounting position and a second mounting position of the tire, in that the first sidewall 520a faces outwards in the first mounting position, and the second sidewall faces 520b faces outwards in the second mounting position.

The tire 500 further includes at least one carcass ply (not shown) extending from the first bead portion to the second bead portion, a circumferential belt disposed above the carcass ply (not shown), and a circumferential tread 530 disposed above the belt. The circumferential tread 530 has a tread pattern shown schematically at 540. The tread pattern 540 is asymmetric about the equatorial plane of the tire 500. Therefore, when the tire 500 is in the first orientation shown in FIG. 4, the tread pattern 540 has a first appearance, and when the tire 500 is rotated to the second orientation shown in FIG. 7, the reversed tread pattern 540 has a second appearance different from the first appearance.

The asymmetry of the tread pattern may cause the tread to exhibit different properties when the tire 100 is mounted in the first mounting position versus the second mounting position. For example, the tread pattern may be selected to account for first wear characteristics when a tire is mounted in the first position, and to account for second wear characteristics different from the first wear characteristics when the tire is mounted in the second position. As one of ordinary skill in the art would understand, the front and rear tires may have different cambers. Additionally, the weight of the vehicle may be distributed different on the front and rear axles. These differences may cause the front tires to have different footprints from the rear tires. The tread patterns in the first and second mounting positions of the tires may be selected to account for these different footprints.

In another example, the tread pattern may be selected such that the circumferential tread exhibits a first snow traction performance when mounted in the first position, and a second snow traction performance different from the first snow traction performance when mounted in the second position.

The tread pattern may also be selected such that other properties are affected by a change in mounting position. For example, the front and rear tires of a vehicle may experience different lateral forces. The tread pattern may be selected to effectively manage these different lateral forces.

Additionally, or in the alternative, the position and orientation of the carcass ply may be selected such that the carcass ply causes the tire to exhibit different properties according to the mounting position. Such differences in carcass plies may not be readily observable from the exterior of the tire, but the tire would still exhibit asymmetric properties.

The tread pattern and the position and orientation of the carcass ply may be designed to account for the different forces that are exhibited on the front and rear tires. Such different forces may cause the front and rear tires to wear differently.

In such an embodiment, the first mounting direction may be indicated as a Front Mounting Position, and the second rotation direction may be indicated as a Rear Mounting Position on one or more locations on the tire. As can be seen in the illustrated embodiment, a first indicia 550a is disposed on the first sidewall 520a and a second indicia 550b is disposed on the second sidewall 520b of the tire 500. While the illustrated embodiment shows indicia that includes a written description, it should be understood that the indicia may take any form or size.

Such indicia may be used to aid a person in mounting axle specific tires on a vehicle. As shown in FIG. 8, the properties of the tire 500 may be selected so that four tires having substantially the same sidewalls, carcass plies, and circumferential tread may be mounted on a vehicle 600 in such a way that first and second tires $500_1$, $500_2$ on a front axle 610 exhibit different properties than third and fourth tires $500_3$, $500_4$ mounted on a rear axle 620.

In the illustrated embodiment, the first tire $500_1$ is mounted on a first wheel (not shown), the second tire $500_2$ is mounted on a second wheel (not shown), the third tire $500_3$ is mounted on a third wheel (not shown), and the fourth tire $500_4$ is mounted on a fourth wheel (not shown). The first wheel and tire are mounted on a left end of the front axle 610 of a vehicle 600, such that a first sidewall $520a_4$ of the first tire $500_1$ faces outwards, and a second sidewall $520b_1$ of the first tire $500_1$ faces inwards. The second wheel and tire are mounted on a right end of the front axle 610 of the vehicle 600, such that a first sidewall $520a_2$ of the second tire $500_2$ faces outwards, and a second sidewall $520b_2$ of the second tire $500_2$ faces inwards. The third wheel and tire are mounted on a left end of the rear axle 620 of the vehicle 600, such that a first sidewall $520a_3$ of the third tire $500_3$ faces inwards, and a second sidewall $520b_3$ of the third tire $500_3$ faces outwards. The fourth wheel and tire are mounted on a right end of the rear axle 620 of the vehicle 600, such that a first sidewall $520a_4$ of the fourth tire $500_4$ faces inwards, and a second sidewall $520b_4$ of the fourth tire $500_4$ faces outwards.

It should be understood that the tires may be mounted on the vehicle in any order, and that certain steps described above may be performed concurrently or in a different order.

When servicing the vehicle, the tires may be rotated in the manner illustrated in FIG. 9, without having to dismount the tires from the wheels. The first wheel and tire, and second wheel and tire are removed from the front axle 610 of the vehicle 600. The first wheel and tire are mounted on the right end of the front axle 620 of the vehicle 600, such that the first sidewall $520a_1$ of the first tire $500_1$ faces outwards, and the second sidewall $520b_1$ of the first tire $500_1$ faces inwards. The second wheel and tire are mounted on the left end of the front axle 610 of the vehicle 600, such that a first sidewall $520a_2$ of the second tire $500_2$ faces outwards, and a second sidewall $520b_2$ of the second tire $500_2$ faces inwards.

The third wheel and tire, and fourth wheel and tire are removed from the rear axle 620 of the vehicle 600. The third wheel and tire are mounted on the right end of the rear axle 620 of the vehicle 600, such that a first sidewall $520a_3$ of the third tire $500_3$ faces inwards, and a second sidewall $520b_3$ of the third tire $500_3$ faces outwards. The fourth wheel and tire are mounted on the left end of the rear axle 620 of the vehicle 600, such that a first sidewall $520a_4$ of the fourth tire $500_4$ faces inwards, and a second sidewall $520b_4$ of the fourth tire $500_4$ faces outwards.

It should be understood that the steps of rotating tires may be performed in any order and that certain steps described above may be performed concurrently or in a different order. Additionally, it should also be understood that the tires may be dismounted from the wheels such that they may be remounted in any position.

In each of the embodiments described above, and illustrated in FIGS. 2-14, directional tread elements may be selected for the tire that display first characteristics when rotated in a first direction, and second characteristics different from the first characteristics when rotated in a second direction opposite the first direction. FIGS. 15-19 illustrate examples of tread elements that exhibit different characteristics in different rolling directions. While each of these figures illustrate a single feature, it should be understood that tread elements may employ two or more of the illustrated features. For the sake of brevity the various combinations of features are not shown herein.

Figure 15:
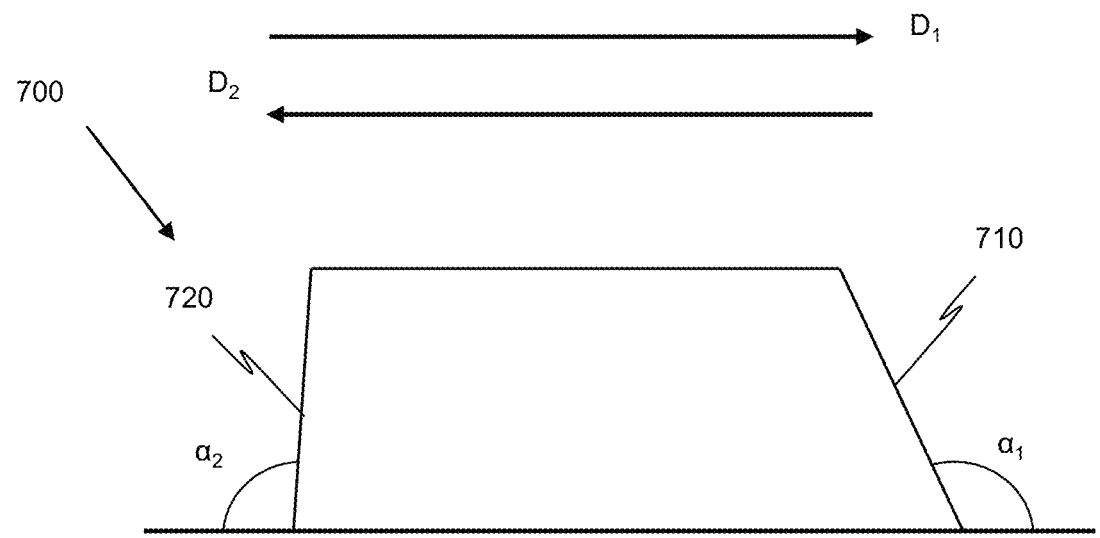
FIG. 15 is a schematic drawing of a profile of one embodiment of a tread element for a tire.

FIG. 15 is a profile view of one embodiment of a tread element 700 that exhibits first characteristics in a first rolling direction $D_1$ and second characteristics in a second rolling direction $D_2$. The tread element 700 includes a first wall 710 and a second wall 720. The first wall 710 is disposed at a first angle $\alpha_1$ with respect to the base 730 of a groove in the tire. The second wall 720 is disposed at a second angle $\alpha_2$ with respect to the base 730 of a groove in the tire that is greater than the first angle $\alpha_1$. When the tire is rotated in the first direction $D_1$, the top of the tread element 700 and the first wall 710 form a leading edge (i.e., the edge that first comes into contact with the rolling surface). When the tire is rotated in the second direction $D_2$, the top of the tread element 700 and the second wall 720 form a leading edge. The shallower angle $\alpha_1$ of the first wall 710 causes lower edge pressure on the tread element 700 when the tire is rotated in the first direction $D_1$, compared to when the tire is rotated in the second direction $D_2$. This effect is utilized to achieve directional performance of the lug related to traction, wear, noise and other tire performance characteristics.

Figure 16:
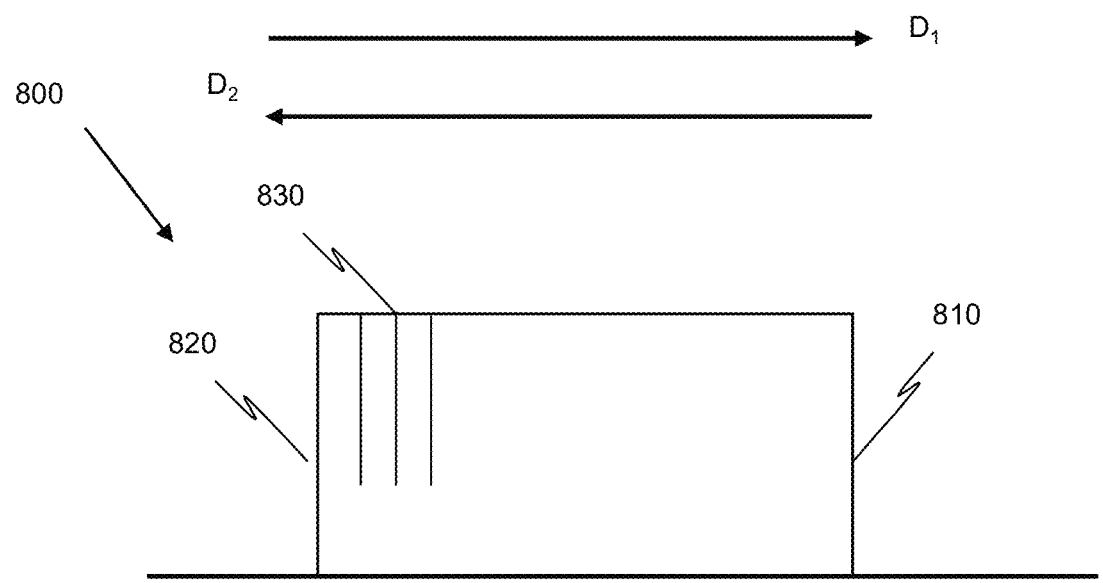
FIG. 16 is a schematic drawing of a profile of an alternative embodiment of a tread element for a tire.

FIG. 16 is a profile view of another embodiment of a tread element 800 that exhibits first characteristics in a first rolling direction $D_1$ and second characteristics in a second rolling direction $D_2$. The tread element 800 includes a first wall 810 and a second wall 820. The tread element 800 includes a plurality of sipes 830 adjacent the second wall, and no sipes adjacent the first wall. In an alternative embodiment (not shown), the tread element may have sipes adjacent both wall, but a greater number of sipes adjacent the second wall.

When the tire is rotated in the first direction $D_1$, the top of the tread element 800 and the first wall 810 form a leading edge. When the tire is rotated in the second direction $D_2$, the top of the tread element 800 and the second wall 820 form a leading edge, and the sipes 830 provide additional edges adjacent the leading edge. This effect is utilized to achieve directional performance of the lug related to traction, wear, noise and other tire performance characteristics.

Figure 17:
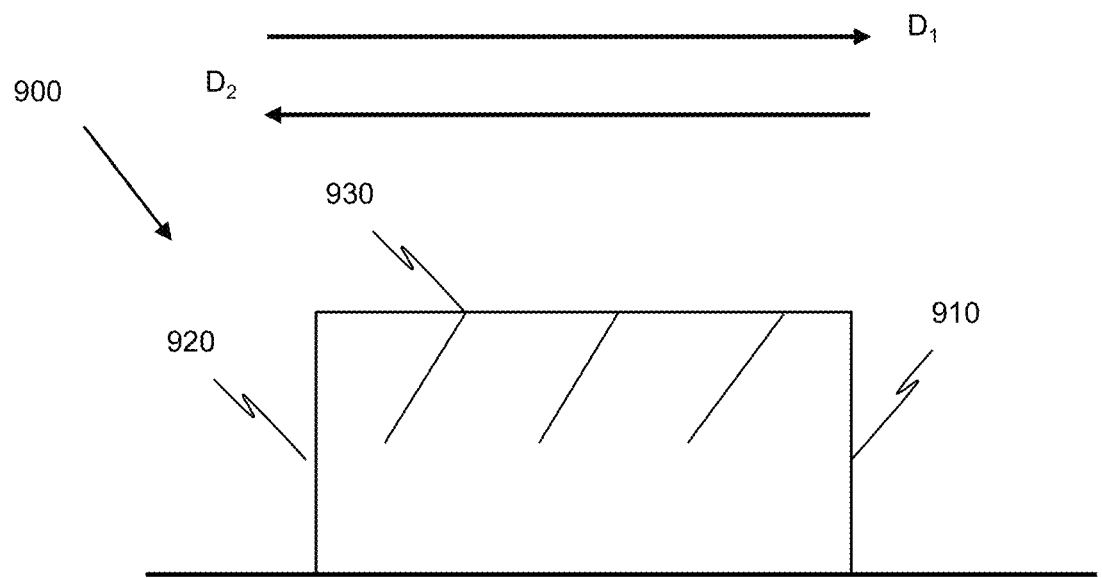
FIG. 17 is a schematic drawing of a profile of another alternative embodiment of a tread element for a tire.

FIG. 17 is a profile view of yet another embodiment of a tread element 900 that exhibits first characteristics in a first rolling direction $D_1$ and second characteristics in a second rolling direction $D_2$. The tread element 900 includes a first wall 910 and a second wall 920. The tread element 900 includes a plurality of angled sipes 930. When the tire is rotated in the first direction $D_1$, the rolling surface provides a shear force on the top of the tread element 900 that causes the angled sipes 930 to open and provide additional edges. When the tire is rotated in the second direction $D_2$, the rolling surface provides a shear force on the top of the tread element 900 that causes the angled sipes 930 to close, thereby eliminating the additional edges. This effect is utilized to achieve directional performance of the lug related to traction, wear, noise and other tire performance characteristics.

Figure 18:
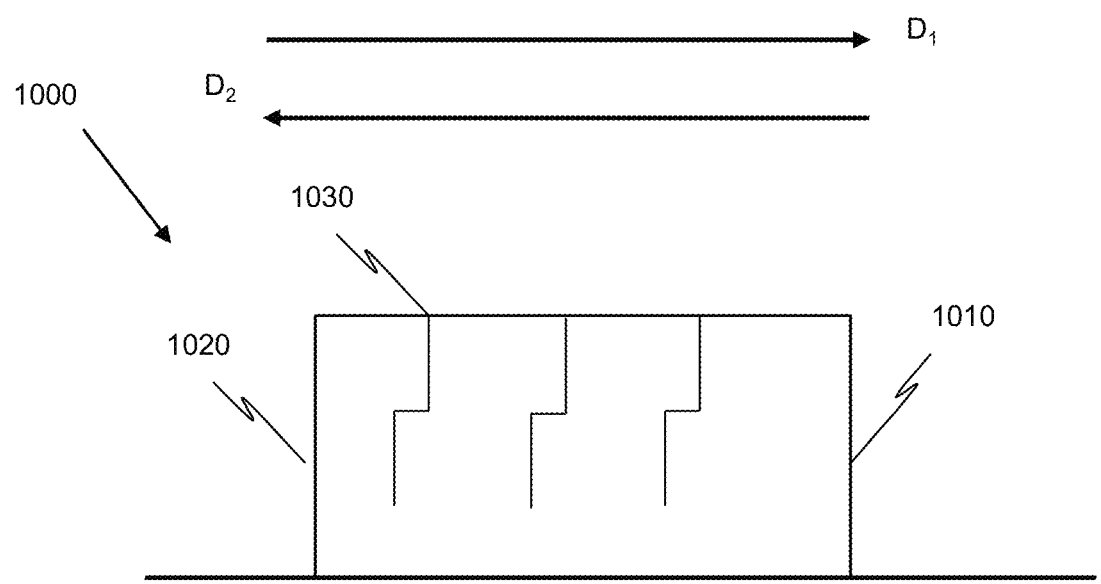
FIG. 18 is a schematic drawing of a profile of yet another alternative embodiment of a tread element for a tire.

FIG. 18 is a profile view of still another embodiment of a tread element 1000 that exhibits first characteristics in a first rolling direction $D_1$ and second characteristics in a second rolling direction $D_2$. The tread element 1000 includes a first wall 1010 and a second wall 1020. The tread element 1000 includes a plurality of ratchet-shaped sipes 1030, that may be referred to as three-dimensional (or 3D) sipes 1030. When the tire is rotated in the first direction $D_1$, the rolling surface provides a shear force on the top of the tread element 1000 that causes the ratchet-shaped sipes 1030 to open and provide additional edges. When the tire is rotated in the second direction $D_2$, the rolling surface provides a shear force on the top of the tread element 1000 that causes the ratchet-shaped sipes 1030 to close, thereby eliminating the additional edges. This effect is utilized to achieve directional performance of the lug related to traction, wear, noise and other tire performance characteristics.

Figure 19:
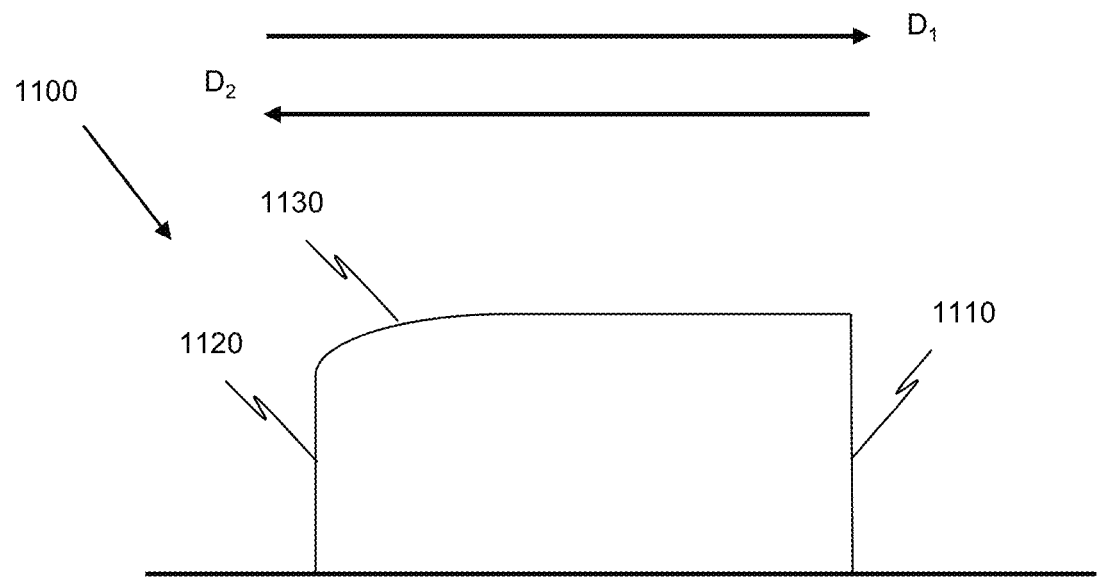
FIG. 19 is a schematic drawing of a profile of still another alternative embodiment of a tread element for a tire.

FIG. 19 is a profile view of still another embodiment of a tread element 1100 that exhibits first characteristics in a first rolling direction $D_1$ and second characteristics in a second rolling direction $D_2$. The tread element 1100 includes a first wall 1110 and a second wall 1120. The tread element 1100 includes an edge treatment. In this embodiment, the edge treatment is a rounded chamfer 1130 extending from the second wall 1120 to a top surface of the tread element 1100. When the tire is rotated in the first direction $D_1$, the top of the tread element 1100 and the first wall 1110 form a leading edge. When the tire is rotated in the second direction $D_2$, the top of the tread element 1100 and the second wall 1120 form a leading edge. The rounded chamfer 1130 extending from the second wall 1120 causes lower edge pressure on the tread element 1100 when the tire is rotated in the second direction $D_2$, compared to when the tire is rotated in the first direction $D_1$. It should be understood that other edge treatments may also be employed, such as planar chamfers.

It should be understood that the tread element 1100 may be a lug, bounded by a pair of grooves. Alternatively, the tread element 1100 may represent a portion of a lug, bounded by a pair of sipes.

In the illustrated embodiment, the rounded chamfer 1130 has a length that is substantially greater than its height. In one particular embodiment, the length is four times greater than the height. In another known embodiment, the length is two times greater than the height. In an alternative embodiment (not shown), the height is greater than or equal to the length.

Figure 20:
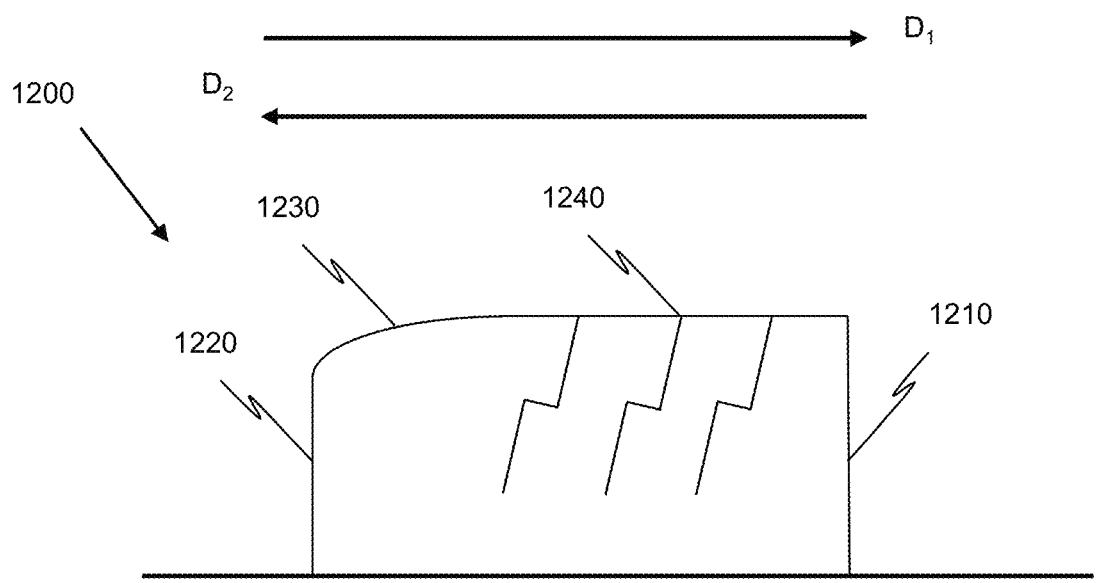
FIG. 20 is a schematic drawing of a profile of yet another alternative embodiment of a tread element for a tire.

FIG. 20 is a profile view of still another embodiment of a tread element 1200 that exhibits first characteristics in a first rolling direction $D_1$ and second characteristics in a second rolling direction $D_2$. The tread element 1200 shows that multiple features may be encompassed in a single tread element. In the illustrated embodiment, the tread element 1200 includes a first wall 1210, and an edge treatment such as a rounded chamfer 1130 extending from the second wall 1220 to a top surface of the tread element 1200. The tread element further includes ratchet shaped sipes 1240 that are disposed at an angle and proximal to the first wall 1210. However, it should be understood that any combination of the above embodiments may be included in a single tread element.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of mounting a tire on a vehicle, the method comprising:
   providing a tire having a first side, a second side, and a circumferential tread disposed about the tire,
      wherein the first side defines a first forward rotation direction that is a rotation of the tire in a counterclockwise direction when the tire is mounted on a vehicle in a first orientation and viewed from the first side,
      wherein the second side defines a second forward rotation direction of the tire that is a rotation of the tire in the counterclockwise direction when the tire is mounted on the vehicle in a second orientation opposite the first orientation and viewed from the first side,
      wherein the circumferential tread includes a plurality of tread elements, each of the plurality of tread elements having a rolling surface and edges,
      wherein at least one of the plurality of tread elements includes a plurality of sipes that are ratchet-shaped in a depth direction of the tire,
      wherein the plurality of sipes that are ratchet-shaped are disposed on a first half of the tread element and no sipes are disposed on a second half of the tread element,
      wherein the plurality of sipes that are ratchet-shaped in a depth direction of the tire causes the tire to exhibit a first tire performance when the tire is mounted on the vehicle in the first orientation and rotated in the first forward rotation direction, the tire performance being selected from the group consisting of braking, dry driving traction, noise, wear performance, and snow traction performance,
      wherein the plurality of sipes that are ratchet-shaped in a depth direction of the tire causes the tire to exhibit a second tire performance that is different from the first tire performance when the tire is mounted on the vehicle in the second orientation and rotated in the second forward rotation direction,
      wherein, when the tire is rotated in the first forward rotation direction, the rolling surface provides a shear force on the top of the tread element that causes the ratchet-shaped sipes to open and provide additional edges, and
      wherein, when the tire is rotated in the second forward rotation direction, the rolling surface provides a shear force on the top of the tread element that causes the ratchet-shaped sipes to close, thereby eliminating the additional edges;
   mounting the tire on the vehicle in the first orientation for driving the vehicle in a first set of conditions; and
   mounting the tire on the vehicle in the second orientation for driving the vehicle in a second set of conditions.

2. The method of claim 1, wherein the tire includes a first bead portion, a second bead portion, and at least one carcass ply extending from the first bead portion to the second bead portion.

3. The method of claim 1, wherein the circumferential tread has a directional tread pattern.

4. The method of claim 1, further comprising driving the vehicle in the first set of conditions and driving the vehicle in the second set of conditions.

5. A method of mounting a plurality of tires on a vehicle having a front axle and a rear axle, the method comprising:
   providing four tires, including a first tire, a second tire, a third tire, and a fourth tire,
      wherein each of the four tires has a first side, a second side, and a circumferential tread disposed about the tire and having a plurality of tread elements, each of the plurality of tread elements having a rolling surface and edges,
      wherein each of the plurality of tread elements has a plurality of sipes that are ratchet-shaped in a depth direction of the tire,
      wherein the plurality of sipes that are ratchet-shaped are disposed on a first half of the tread element and no sipes are disposed on a second half of the tread element,
      wherein the plurality of sipes that are ratchet-shaped in a depth direction of the tire causes the tire to exhibit a first tire performance when the tire is mounted on a vehicle in a first orientation and rotated in a first forward rotation direction, and a second tire performance that is different from the first tire performance when the tire is mounted on the vehicle in a second orientation and rotated in a second forward rotation direction, wherein, when the tire is rotated in the first forward rotation direction, the rolling surface provides a shear force on the top of the tread element that causes the ratchet-shaped sipes to open and provide additional edges,
      wherein, when the tire is rotated in the second forward rotation direction, the rolling surface provides a shear force on the top of the tread element that causes the ratchet-shaped sipes to close, thereby eliminating the additional edges,
      wherein the first side of each of the four tires is substantially the same,
      wherein the second side of each of the four tires is substantially the same, and
      wherein the circumferential tread of each of the four tires is substantially the same;
   mounting the first tire on a first wheel;
   mounting the second tire on a second wheel;
   mounting the third tire on a third wheel;
   mounting the fourth tire on a fourth wheel;
   mounting the first wheel on a left end of a front axle of the vehicle, such that the first side of the first tire faces away from the vehicle and such that the first tire is in the first orientation;
   mounting the second wheel on a right end of the front axle of the vehicle, such that the second side of the second tire faces away from the vehicle and such that the second tire is in the first orientation;
   mounting the third wheel on a left end of a rear axle of the vehicle, such that the first side of the third tire faces away from the vehicle and such that the third tire is in the first orientation;
   mounting the fourth wheel on a right end of the rear axle of the vehicle, such that the second side of the fourth tire faces away from the vehicle and such that the fourth tire is in the first orientation;

removing the first wheel and first tire from the front axle of the vehicle;

removing the second wheel and second tire from the front axle of the vehicle;

removing the third wheel and third tire from the rear axle of the vehicle;

removing the fourth wheel and fourth tire from the rear axle of the vehicle;

mounting the first wheel and first tire on the right end of the rear axle of the vehicle, such that the first side of the first tire faces away from the vehicle and such that the first tire is in the second orientation;

mounting the second wheel and second tire on the left end of the rear axle of the vehicle, such that the second side of the second tire faces away from the vehicle and such that the second tire is in the second orientation;

mounting the third wheel and third tire on the right end of the front axle of the vehicle, such that the first side of the third tire faces away from the vehicle and such that the third tire is in the second orientation; and mounting the fourth wheel and fourth tire on the left end of the front axle of the vehicle, such that the second side of the fourth tire faces away from the vehicle and such that the fourth tire is in the second orientation.

6. The method of claim 5, wherein each of the four tires includes at least one indicia disposed on each side including an indicator designating the first forward rotation direction and the second forward rotation direction.

7. The method of claim 6, wherein the at least one indicia identifies the first forward rotation direction as a summer rotation direction and identifies the second forward rotation direction as a winter rotation direction.

8. The method of claim 5, wherein each tread element has a rounded chamfer at a first end and an edge at a second end.

* * * * *